UNITED STATES PATENT OFFICE.

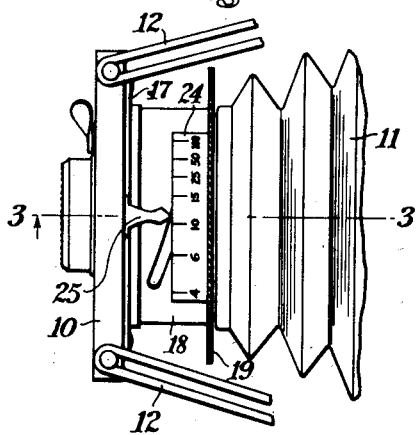
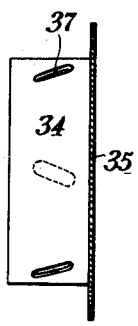
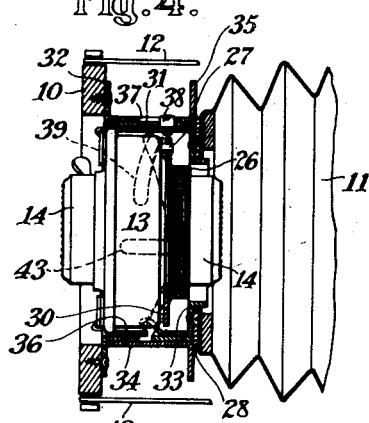
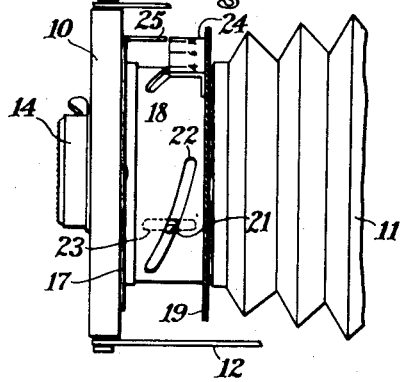
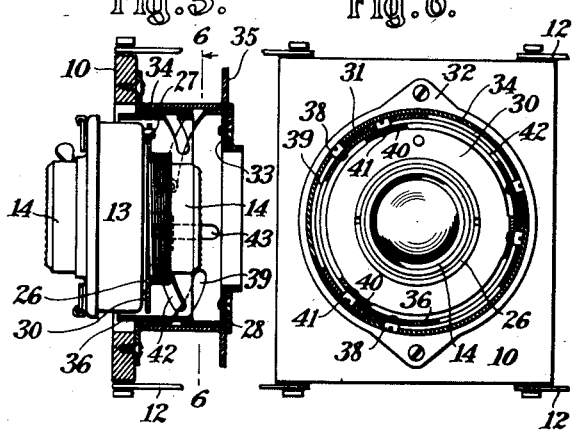
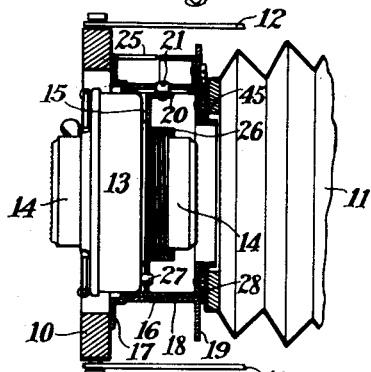
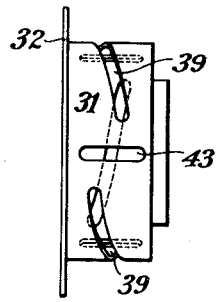
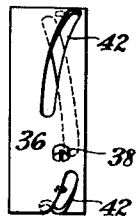

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

FOCUSING DEVICE.

1,170,206.

Specification of Letters Patent. Patented Feb. 1, 1916.

Application filed December 12, 1914. Serial No. 876,886.

*To all whom it may concern:*

Be it known that I, ANDREW WOLLENSAK, a citizen of the United States, and resident of Rochester, in the county of Monroe and State of New York, have invented certain new and useful Improvements in Focusing Devices, of which the following is a specification.

This invention relates to means for focusing a photographic camera, particularly a camera of the folding type.

One object of the invention is to produce an arrangement by which an axial movement, for the purpose of focusing, may be imparted to the lens or lenses of a camera, without movement of the camera-front for this purpose, these means being compact, conveniently and accurately operable, and preferably provided with devices for indicating the focal position of the lens. To this end I employ an arrangement of tubular housing and sleeves, having pin-and-slot connections of such a character that the rotation of one of said members causes an axial movement of the lens-carrier in the manner hereinafter set forth, and in which the focal position of the lens as so adjusted may be indicated by means of a suitable pointer and scale or equivalent arrangement.

Another object of the invention is to produce a focusing-device which shall be applicable to a camera of the folding type, in which the camera-front is held, when the camera is unfolded, at an invariable distance from the focal plane of the camera, the focusing-device being so constructed, however, as not to increase the fore-and-aft dimensions of the extensible portions of the camera when folded. To this end I so construct the focusing-device that not only the lens-mount, but also the shutter-casing with which it is associated in the usual manner, are axially movable during the focusing operation, while the mechanism for producing this movement is of an annular form, and is so arranged that when the lens-mount and the shutter-casing are in fully retracted position the focusing-mechanism does not extend either in the front or in the rear of the lens-mount and shutter-casing, so that no addition is made to the necessary length of the extensible parts of the camera when in the folded position.

In the accompanying drawings:—Figures 1, 2 and 3 are, respectively, a plan-view, a side-elevation, and a vertical section on the line 3—3 of Fig. 1, showing portions of a camera embodying the present invention, while a modified form is shown in Figs. 4 to 9, inclusive, Figs. 4 and 5 being vertical median sections, Fig. 6, a vertical section on the line 6—6 in Fig. 5, and Figs. 7, 8 and 9 being side-elevations of the adjusting-sleeve, the housing, and the actuating-sleeve, respectively.

The invention is illustrated as embodied in a camera of a well-known folding type, with the usual extensible front 10 and bellows 11, and folding arms or supporting-devices 12 for connecting the camera-front with the body of the camera (not shown). The camera is provided with a well known form of shutter, inclosed within the usual casing 13, the lens or lenses being of circular form, the usual lens-mounts 14 fixed to the front and the back of the shutter-casing, as shown in Fig. 3.

The focusing-mechanism, in the embodiment shown in Figs. 1, 2 and 3, comprises a plate 15 which may be designated as a lens-carrier. This plate has a central opening in which a nipple, projecting from the rear of the shutter-casing, is seated, the casing being secured in place by means of a screw-threaded ring or nut 26 bearing against the lens-carrier. The lens-carrier moves axially within a generally cylindrical tubular housing 16, and this housing serves as means for connecting the camera-front 10 with the bellows 11, being provided with an outwardly-extending flange 17 at its front end, which may be screwed to the camera-front, and within an inwardly-extending flange 45 at its rear end. A plate 28 is screwed to the flange 45, and this plate is, in turn, secured to the forward end of the bellows in any convenient manner.

Loosely surrounding the housing 16 is a sleeve 18, provided with an outwardly-projecting flange 19 at its rear end, this flange being knurled on the edge for convenient manipulation. The flange 17 and the plate 28 limit this sleeve to rotary movements on the housing. In order that the focusing movement of the lens may be produced by rotation of the sleeve 18, the lens-carrier 15 is provided with several equally spaced lugs 20, of which one is shown in Fig. 3, and each of these lugs carries a screw-stud 21, which extends into one of several slots 22 in the sleeve 18. These slots are arranged helically upon the sleeve, while the studs 21 are guided, so as to have only direct fore-and-aft movements, by means of slots 23 in the housing 16, these slots being shown in dotted lines.

The foregoing arrangement is such that when the sleeve 18 is partially rotated upon the housing, the inclined slots 22 cause the studs 21 to move forwardly or rearwardly in the slots 23, thus producing axial movements of the lens-mounts and the shutter-casing. In order that the extent of such movements may be indicated, the adjusting-sleeve 18 is provided with an index-plate 24, which is graduated in accordance with the distance for which the camera is to be focused, and the significant graduation is indicated by a pointer 25 fixed to the flange 17 on the housing.

When the adjusting-sleeve is turned to the extreme position corresponding to the shortest focal distance, the shutter-casing is retracted to a position in which the rear lens-mount 14 is substantially flush with the rearmost part of the focusing-mechanism, namely, the edge of the flange 45, and the shutter-casing is withdrawn into the space within the housing. In this position of the parts the camera-front 10 does not project in front of the forward lens-mount, and accordingly the total length of the mechanism is no greater than that of the lens-mounts and shutter-casing, and as these parts are assembled in the usual manner and have the usual dimensions, there is thus no addition to the over-all dimensions of the extensible parts of the camera when they are in folded position, so that the focusing-device may be applied to a folding camera of ordinary form, without any increase in the size of its casing, or other radical change in its form and construction.

Where it is desirable to provide a considerable range of focal movement without increase in the extent of rotation of the adjusting-sleeve, the arrangement shown in Figs. 4 to 9, inclusive, may be employed. In this case the camera-front is connected with the bellows by a housing 31, similar in general form to the housing 16, and provided with a forward flange 32 which is screwed to the camera-front, and a rear flange 33 upon which the plate 28 is fixed, as in the construction first described. The lens-carrier 30 is substantially similar to that shown in Fig. 3, and is secured to the shutter-casing in the same manner. It is also provided with a series of lugs 40 carrying outwardly-projecting screw-studs 41, as shown in Fig. 6. In this case, however, a third annular member is employed, in the form of a sleeve 36 which has helical slots 42 which are engaged by the studs 41 on the lens-carrier. These studs also extend into slots 43 in the housing to limit the lens-carrier to axial movements.

The actuating-sleeve 36 is provided with a series of screw-studs 38, which extend through helical slots 39 in the housing, and into slots 37 in the adjusting-sleeve 34, these slots 37 being arranged at right-angles to the slots 39 in the housing.

In the construction just described, when the adjusting-sleeve 34 is partially rotated, by means of the knurled flange 35, this movement, through the engagement of the slots 37 with the studs 38, causes the latter to move along the slots 39 in the housing, whereby the actuating-sleeve 36 is given, simultaneously, a partial rotation and an axial movement. This axial movement is imparted to the lens-carrier by the engagement of the slots 42 with the studs 41 on the lens-carrier, and at the same time the rotative movement of the sleeve 36, owing to the helical character of the slots 42, imparts additional axial movement to the lens-carrier, the axial movements of the latter being accordingly twice as great as the axial movements of the actuating-sleeve 36. By this arrangement a considerable movement may be imparted to the lens-carrier by a slight partial rotation of the adjusting-sleeve 34.

I claim:—

1. In a camera, the combination, with the camera-front, of a tubular housing secured thereto; a shutter-casing; a lens mounted on the shutter-casing; the shutter-casing being supported, and axially movable, within the housing; and means for so moving the shutter-casing to focus the camera.

2. In a camera, the combination, with the camera-front, of a tubular housing secured thereto; a shutter-casing; a lens mounted on the shutter-casing; the shutter-casing being supported, and axially movable, within the housing; and means for so moving the shutter-casing to focus the camera, said means including a manually-operable annular member rotatable upon the outer surface of the housing.

3. In a camera, the combination with the camera-front and the bellows, of a housing interposed between them; a lens-carrier axially movable in the housing; and means for so moving the lens-carrier to focus the camera without movement of the front.

4. In a camera, the combination, with the camera-front and the bellows, of a housing interposed between them; a lens-carrier axially movable in the housing; and means for so moving the lens-carrier to focus the camera without movement of the front, said means comprising a manually-operable member rotatably mounted upon the housing.

5. In a camera, the combination, with the camera-front and the bellows, of a housing interposed between them; a lens-carrier axially movable in the housing; and means for so moving the lens-carrier to focus the camera without movement of the front, said means comprising a sleeve surrounding the housing and rotatable thereon, and a flange at the rear end of the sleeve.

6. In a camera, the combination, with the camera-front and the bellows, of a tubular housing interposed between them, a shutter-casing supported, and axially movable, within the housing; a lens mounted on the shutter-casing; and means for moving the shutter-casing and the lens, within the housing, to focus the camera.

7. In a camera, the combination, with the camera-front and the bellows, of a tubular housing interposed between them, a shutter-casing supported, and axially-movable, within the housing; a lens mounted on the shutter-casing; and means for moving the shutter-casing and the lens within the housing to focus the camera, said means comprising a manually-operable sleeve mounted, and rotatable upon, the housing, and connections between the sleeve and the shutter-casing.

8. In a camera, a tubular housing; a sleeve surrounding and rotatable on the housing, the housing and the sleeve having slots disposed at an angle with each other; a lens-carrier axially movable within the housing; and connections, between the lens-carrier and the sleeve, including studs extending into the slots in both the housing and the sleeve, whereby the lens-carrier may be moved axially by rotation of the sleeve.

9. In a camera, a tubular housing; a sleeve surrounding and rotatable on the housing, the housing and the sleeve having slots disposed at an angle with each other; a lens-carrier axially movable within the housing; connections, between the lens-carrier and the sleeve, including studs extending into the slots in both the housing and the sleeve, whereby the lens-carrier may be moved axially by rotation of the sleeve; and coöperating indicating members connected, respectively, with the housing and the sleeve, for indicating the focal position of the lens-carrier within the housing.

10. In a camera, a tubular housing provided with slots; an outer sleeve rotatable on the housing and provided with slots arranged at an angle with the slots in the housing; an inner sleeve rotatable and axially movable within the housing and also having slots arranged at an angle with the slots in the housing; a lens-carrier axially movable within the inner sleeve; studs projecting, from the lens-carrier, into engagement with slots in both the inner sleeve and the housing; and studs projecting, from the inner sleeve, into engagement with slots in both the housing and the outer sleeve.

11. In a camera, a tubular housing provided with slots substantially parallel with its axis; a sleeve rotatably associated with the housing and manually-operable, said sleeve having slots inclined to its axis; a lens-carrier movable axially within the housing and the sleeve; and studs projecting, from the lens-carrier, into engagement with the slots in both the housing and the sleeve.

12. In a camera, the combination of relatively rotatable annular members constituting a focusing device, and a shutter provided with a circular casing, the shutter being connected with and mounted in the focusing device and movable, by the operation thereof, into and out of the space circumscribed by said annular members.

In testimony whereof, I affix my signature in presence of two witnesses.

ANDREW WOLLENSAK.

Witnesses:
 FARNUM F. DORSEY,
 D. GURNEE.